W. YOUNG.
Implement for Bending Hedge-Plants.
No. 206,656. Patented July 30, 1878.
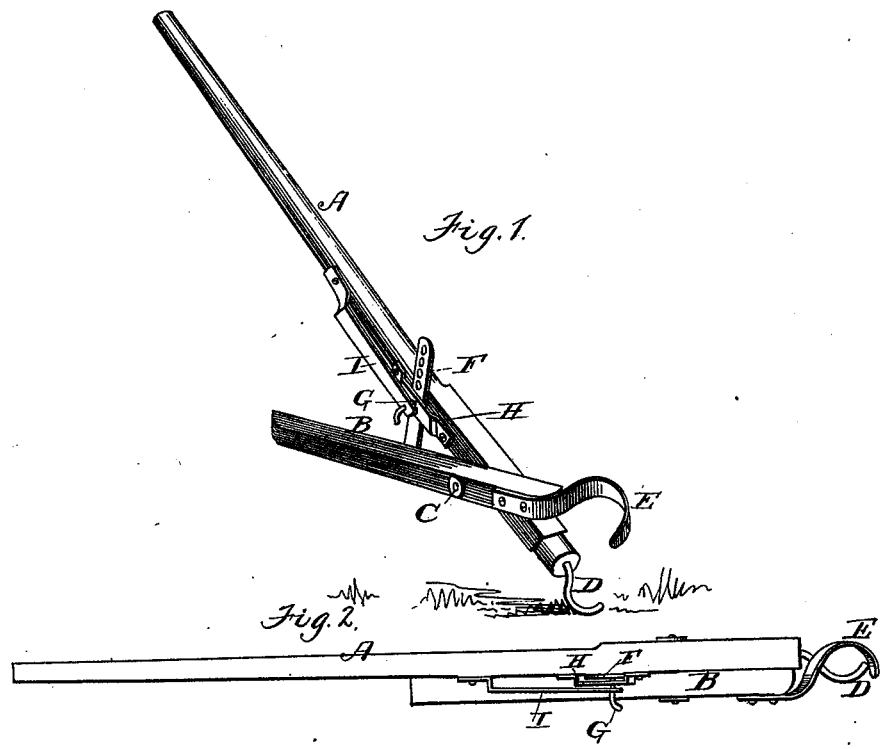

UNITED STATES PATENT OFFICE.

WESLEY YOUNG, OF COLUMBUS, OHIO.

IMPROVEMENT IN IMPLEMENTS FOR BENDING HEDGE-PLANTS.

Specification forming part of Letters Patent No. 206,656, dated July 30, 1878; application filed June 12, 1878.

*To all whom it may concern:*

Be it known that I, WESLEY YOUNG, of Columbus, in the county of Franklin and State of Ohio, have invented a certain new and Improved Implement for Bending Hedge-Plants; and I do hereby declare the following to be a full and exact description of the same, reference being had to the accompanying drawings, forming part of this specification, in which—

Figure 1 is a perspective view of the implement. Fig. 2 is a top-plan view, and Fig. 3 is a view showing its application to a hedge-plant.

Similar letters of reference in the several figures denote the same parts.

The object of my invention is to provide a strong and efficient implement for bending over the plants in the operation of plashing hedges; and to this end it consists of a long handle or lever provided with hooks or bearings to grasp the plants or canes, so that when the implement is turned on its side it will bend down the plant into the proper position for tying.

In the accompanying drawings, A is a long wooden handle, to which a short bar, B, is pivoted at the point C, so that the two shall cross each other, as shown. The short end of the long handle has a hook, D, attached to its end, while the short end of the bar is provided with a somewhat wider hook, E. The two hooks have their concave faces opposite each other, in order that they may properly grasp the hedge-plant or cane between them.

The hooks or jaws are held at a greater or less distance apart, according to the size or bend to be given the plants, by means of the perforated strip F on the bar, and a pin, G, on the handle, entering one or more of the perforations.

The strip F is guided in its movements by a loop, H, on the side of the handle, and the pin G is secured to a spring, I, by which it is kept within the perforations.

The implement is operated as follows: The hooks having been adjusted the proper distance from each other by the means above described, the handle is grasped by the workman, and the hooks applied one on each side the plant, as shown in Fig. 3, the long end of the bar B resting on the ground. In this position the implement is then turned to the right or left, bending down the plant to the proper point, when the workman puts his foot upon the implement, to hold it in such position while he ties the plant down to its place. The implement may then be removed, and the operation repeated with the next standing plant.

Inasmuch as the hook E slides somewhat on the plant, I prefer to make it wide, as shown, to prevent tearing or abrading the bark, as will be readily understood.

Having thus described my invention, what I claim as new is—

1. An implement for bending hedge-plants, consisting of a handle, A, and short bar B, pivoted together so as to cross each other, and provided, respectively, with hooks D E in their short ends, said hooks being bent toward each other, substantially as described, for the purpose specified.

2. The handle A and short bar B, adapted for adjustment to change the position of the hooks with respect to each other, substantially as described, for the purpose specified.

3. An implement for bending hedge-plants, consisting of two crossed pieces pivoted together, and provided with hooks to grasp the plant between them, one above the other, such hooks being made adjustable to and from each other by suitable means, substantially as described.

4. An implement for bending hedge-plants, consisting of a long handle or lever provided with hooks or bearings to grasp the plants or canes, so that when turned sidewise it will bend down the plants or canes into the proper position for tying, substantially as described.

WESLEY YOUNG.

Witnesses:
RALPH BULKLEY,
M. NEIL.